April 28, 1942.  H. F. PITCAIRN  2,281,203

DRIVING MECHANISM FOR AIR ROTORS ESPECIALLY AIRCRAFT SUSTAINING ROTORS

Filed Nov. 14, 1939  2 Sheets-Sheet 1

INVENTOR:
Harold F. Pitcairn
BY
Synnestvedt & Lechner
ATTORNEYS.

April 28, 1942.                H. F. PITCAIRN                 2,281,203
  DRIVING MECHANISM FOR AIR ROTORS ESPECIALLY AIRCRAFT SUSTAINING ROTORS
                  Filed Nov. 14, 1939        2 Sheets-Sheet 2
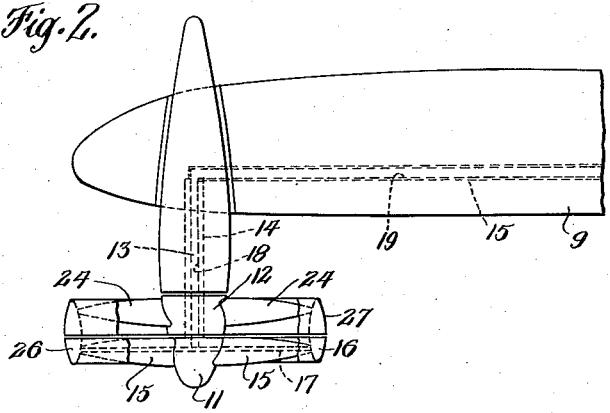
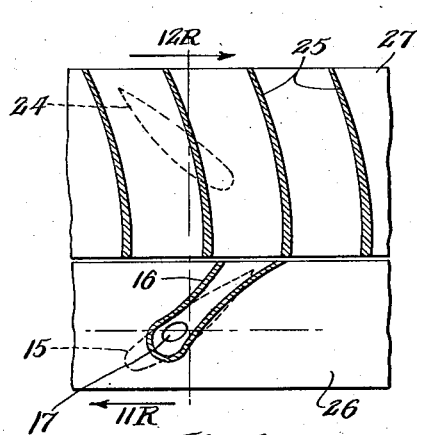
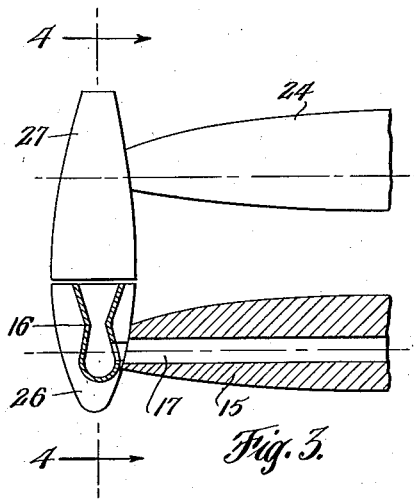
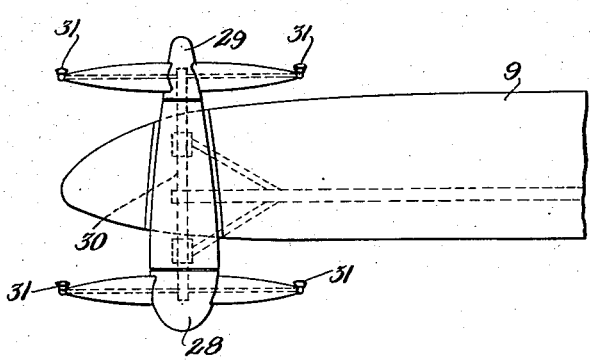
INVENTOR:
Harold F. Pitcairn
BY
Synnestvedt & Lechner
ATTORNEYS.

Patented Apr. 28, 1942

2,281,203

UNITED STATES PATENT OFFICE 2,281,203

DRIVING MECHANISM FOR AIR ROTORS, ESPECIALLY AIRCRAFT SUSTAINING ROTORS

Harold F. Pitcairn, Bryn Athyn, Pa., assignor to Autogiro Company of America, Willow Grove, Pa., a corporation of Delaware Application November 14, 1939, Serial No. 304,308

4 Claims. (Cl. 244—17)

This invention relates to driving mechanism for air rotors, especially aircraft sustaining rotors, and the invention is particularly concerned with a driving mechanism which does not set up counter-torque in the body of the aircraft. The invention, therefore, is particularly useful in making possible the use of only a single sustaining rotor in an aircraft of the helicopter type.

Briefly, the invention is concerned with that type of structure in which propulsive airscrews of relatively small diameter are mounted on the blades of the sustaining rotor, the propulsive airscrews being provided with fluid pressure jets for effecting rotation thereof.

It has heretofore been proposed to drive the sustaining rotor of an aircraft by means of fluid pressure jets carried on the blades adjacent the tips thereof and directly reacting to turn the rotor. However, the sustaining rotor for an aircraft is ordinarily of relatively large diameter and relatively low blade tip speed. Since jet devices are highly inefficient at relatively low speeds, prior proposals to mount jets directly on sustaining rotor blades has proven ineffective. The general type of arrangement contemplated by the present invention (wherein a jet driven airscrew is mounted on a rotor blade) is much more effective and efficient, because of the fact that an efficient propulsive airscrew has a blade tip speed high enough to give reasonably efficient jet propulsion. To bring about this improvement in efficiency, it may be noted that the tip speed of the propulsive airscrews should be of the order of 1000 feet per second, the tip speed of the rotor blades being of the order of several hundred feet per second, for example, 200 or 300.

A system of this general character is described and claimed in copending application of Agnew E. Larsen, Serial No. 270,715, filed April 29, 1939. The present invention contemplates features which not only attain the improvement in efficiency above referred to, but which also achieve certain additional objects and advantages, as follows:

In accordance with the present invention, instead of employing only a single propulsive airscrew on a blade of the rotor, a pair of tandem coaxial oppositely rotating airscrews is used, thereby neutralizing gyroscopic forces of the two airscrews and cancelling or eliminating certain torsional and twisting moments tending to cause deformation of the rotor blade where only a single airscrew is used. Since substantial flexibility, at least in certain planes, is desirable in rotor blades, the elimination of forces tending to deform the blades is a matter of considerable importance.

The foregoing feature, moreover, is of especial advantage in an aircraft sustaining rotor of the type embodying blades which have freedom for "flapping" movement in a direction generally transverse the rotative path of travel. In such construction, this freedom for flapping movement is relied upon for a number of purposes including compensation for differential lift effects in translational flight, and elimination of gyroscopic moments, and the freedom, therefore, should not be interfered with. In a driving system in accordance with the present invention, incorporating a pair of tandem coaxial oppositely rotating airscrews, the moments set up by the airscrews individually in directions tending to interfere with freedom for blade flapping are balanced, so that unimpaired compensation for differential lift effects and the like occurs.

As above indicated, in accordance with the invention, the airscrews are preferably driven by fluid pressure jet devices, thereby achieving efficiency of jet propulsion and, at the same time, eliminating the necessity for mounting airscrew driving motors on the rotor blades or the necessity for carrying drive shafting for the airscrews outwardly from the hub through the rotor blades.

Still further, the present invention contemplates a novel fluid pressure driving arrangement for the pair of tandem coaxial airscrews, resulting in further efficiency of fluid pressure propulsion, as will appear more fully hereinafter.

How the foregoing objects and advantages are achieved, together with others which will occur to those skilled in the art, will be more apparent from the following description referring to the accompanying drawings, in which—

Figure 2 is a top plan view of the tip portion of one of the rotor blades shown in Figure 1, the view being on an enlarged scale and certain parts being broken away for clarity of illustration;

Figure 3 is a fragmentary view on a still further enlarged scale illustrating portions of the propulsive airscrew driving mechanism;

Figure 4 is a fragmentary sectional view taken substantially as indicated by the section line 4—4 on Figure 3; and Figure 5 is a view similar to Figure 2 but illustrating a different airscrew arrangement embodying various features of the invention.

Figure 1:
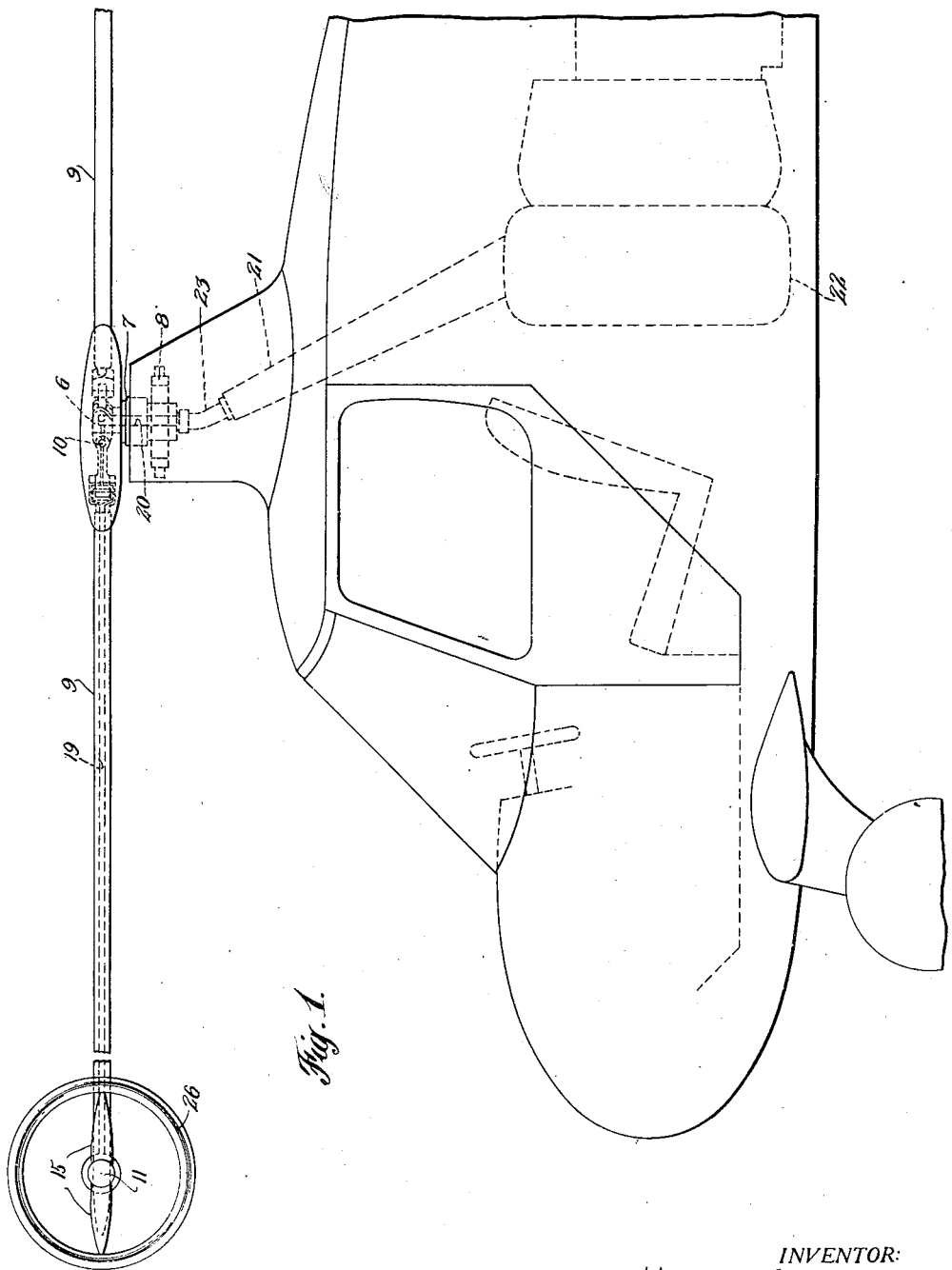
Figure 1 is an outline side elevational view of the forward portion of an aircraft having a sustaining rotor constructed in accordance with the present invention.

As seen in Figure 1, the hub for the motor is indicated at 6, the hub being rotatively mounted in a support 7 which may be connected with the body of the craft through a gimbal ring assembly 8 providing for tilting of the hub in all directions for purposes of control of the craft, in the general manner described and claimed in copending application of Juan de la Cierva, Serial No. 645,985, filed December 6, 1932.

Each blade 9 of the rotor is connected with the hub 6 by one or several pivots including, at least, a flapping pivot 10 providing freedom for movement of the blades individually in a direction generally transverse the rotative path of travel, for purposes hereinbefore referred to. As best seen in Figures 2 and 3, adjacent the tip of each blade, a pair of tandem coaxial airscrews 11 and 12 is arranged, the mounting shafts 13 and 14 preferably being carried by the main longitudinal structural element or spar 15 of the blade. For the purpose of driving the airscrew 11, each blade 15 thereof is equipped with a fluid pressure jet nozzle 16 adjacent the blade tip, the nozzle being supplied with actuating fluid through passage 17 formed in the airscrew blade and extended into the hub for communication with a central passage 18 provided in the shaft 13 for airscrew 11. The passage 18, in turn, communicates with passage 19 in the spar 15 of the rotor blade, and at the hub, passage 19 (see Figure 1) has communication through the pivot devices with a central passage 20 which is connected to conduit 21 extending from the compressor or other suitable source of fluid 22. A flexible conduit section 23 is employed between the hub and conduit 21 in order to permit tilting movement of the hub for control purposes.

While similar jet nozzles may be employed to rotate the second airscrew 12 of the pair, I prefer to equip the blades 24 of airscrew 12 with impeller blades 25 (see Figure 4) of type similar to that used in turbine practice, the blades 25 being positioned to receive fluid ejected from nozzles 16 of the forward airscrew. In this figure the direction of rotation of the airscrews 11 and 12 is indicated by the arrows 11R and 12R.

To maintain efficiency of this arrangement, a ring 26 is carried by the tips of blades 15 of the forward propeller, serving to house the jet nozzles 16; and a complementary ring 27 is supported by the tips of blades 24 of the rear airscrew, this latter ring serving to enclose and position the impeller blades 25. Ring 27 is open at its forward edge to permit fluid delivered from the nozzles 16 to impinge on the impeller blades, and is further open at its rear edge for fluid discharge. The rings 26 and 27, as clearly shown in the drawings, are positioned in close proximity to each other to avoid loss of fluid.

By virtue of the mechanism described, a single set of jet devices produces opposite rotative reactions on the two airscrews.

In the arrangement of Figure 5, a pair of tandem coaxial airscrews 28 and 29 is employed, the airscrews being positioned one in front of and the other to the rear of the rotor blade 9. These airscrews may be mounted on individual shafts, or the hubs thereof may be freely rotative with respect to a common supporting shaft 30, so as to permit rotation in opposite directions. In this form, each of the airscrews is equipped with jet reaction nozzles 31 positioned to effect rotation of the two airscrews in opposite directions. Fluid may be supplied to the jets for each airscrew through internal passages provided in the airscrew blades and mounting shafts and through the rotor blade spar, as before.

Each of the embodiments described achieves the major advantages above mentioned by virtue of employing two oppositely rotating airscrews on each rotor blade, thereby eliminating moments tending to deform the blade or interfere with its flapping movement in compensating for or accommodating the varying aerodynamic forces of flight.

The employment of jet devices on the blades of only one of the airscrews, and the use of impeller blades on the other airscrew (as shown in the arrangement of Figs. 1–4), is of advantage since in this way a portion of the jet energy which would otherwise be dissipated is utilized to drive the rear propeller.

I claim:
1. In air rotors, a pair of tandem coaxial oppositely rotating airscrews, fluid jet propulsion means mounted on the blades of one of said airscrews, and fluid pressure operable impeller means mounted on the blades of the other of said airscrews and juxtaposed to receive fluid ejected from said jet means.

2. In air rotors, a relatively large diameter bladed rotor, a pair of relatively small diameter tandem coaxial oppositely rotating airscrews mounted on a blade of said rotor to effect rotation thereof, fluid pressure jet means mounted on the blades of one of said airscrews, means providing for delivery of fluid under pressure to the jet means, and fluid pressure operable impeller means mounted on the blades of the other of said airscrews and juxtaposed to receive fluid ejected from the jet means.

3. In air rotors, a relatively large diameter bladed rotor, a pair of relatively small diameter tandem coaxial oppositely rotating airscrews mounted on a blade of said rotor to effect rotation thereof, fluid pressure jet means mounted on the blades of one of said airscrews, means providing for delivery of fluid under pressure to the jet means through the blade of said rotor, and fluid pressure operable impeller means associated with the other of said airscrews and juxtaposed to receive fluid ejected from the jet means.

4. In an aircraft, a sustaining rotor incorporating a blade or blades mounted with freedom for aerodynamic force compensating movements in a direction transverse the rotative path of travel, and mechanism for driving the rotor including a pair of airscrews carried by a blade of the rotor, said airscrews being coaxial and mounted in tandem, fluid jet propulsion means mounted on the blades of one of said airscrews for effecting rotation thereof, and fluid pressure operable impeller means mounted on the blades of the other of said airscrews and juxtaposed to receive fluid ejected from said jet means.

HAROLD F. PITCAIRN.

CERTIFICATE OF CORRECTION.

Patent No. 2,281,203.　　　　　　　　　　April 28, 1942.

HAROLD F. PITCAIRN.

It is hereby certified that error appears in the printed specification of the above numbered patent requiring correction as follows: Page 2, first column, line 1, for the word "motor" read --rotor--; and second column, lines 52 and 53, claim 3, for "associated with" read --mounted on the blades of--; and that the said Letters Patent should be read with this correction therein that the same may conform to the record of the case in the Patent Office.

Signed and sealed this 16th day of June, A. D. 1942.

Henry Van Arsdale,
(Seal)　　　　　　　　　　　Acting Commissioner of Patents.